(12) United States Patent
Mittal et al.

(10) Patent No.: US 9,249,937 B2
(45) Date of Patent: Feb. 2, 2016

(54) WATER OUTLET CONTROL SYSTEM USING SOUND VARIATION

(71) Applicant: International Business Machines Corporation, Armonk, NY (US)

(72) Inventors: Vani Mittal, Ghaziabad (IN); Anbumunee Ponniah, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 428 days.

(21) Appl. No.: 13/652,511

(22) Filed: Oct. 16, 2012

(65) Prior Publication Data

US 2014/0102541 A1 Apr. 17, 2014

(51) Int. Cl.
| | |
|---|---|
| *G05B 13/02* | (2006.01) |
| *G05D 7/00* | (2006.01) |
| *G05D 11/00* | (2006.01) |
| *G06F 19/00* | (2011.01) |
| *G01N 11/00* | (2006.01) |
| *G01M 3/04* | (2006.01) |
| *G01N 29/00* | (2006.01) |
| *F17D 1/00* | (2006.01) |
| *F17D 3/00* | (2006.01) |
| *G05D 13/10* | (2006.01) |
| *F16K 31/06* | (2006.01) |
| *G08B 21/00* | (2006.01) |
| *E03C 1/00* | (2006.01) |

(52) U.S. Cl.
CPC .............. *F17D 3/00* (2013.01); *Y10T 137/0324* (2015.04); *Y10T 137/8158* (2015.04)

(58) Field of Classification Search
CPC ............. F01D 3/00; G08B 21/00; E03C 1/01; G01N 29/14; G01N 29/22; G01N 29/46; G01M 3/24; G05D 7/06; F03B 13/00
USPC ............. 700/282, 28; 702/54; 73/40, 59, 592; 137/2, 5, 56, 55, 6, 560; 340/6, 606; 4/66, 668; 251/12; 367/93
See application file for complete search history.

(56) References Cited

U.S. PATENT DOCUMENTS

| | | |
|---|---|---|
| 4,520,516 A | 6/1985 | Parsons |
| 4,931,938 A | 6/1990 | Hass |
| 6,244,292 B1 | 6/2001 | Antunez |

(Continued)

OTHER PUBLICATIONS

Shifeng Liu, Luming Li, Jian Cui, Tie Li, Bang Xian Li and Aihong Dong, "Acoustic Emission Detection of Underground Pipeline Leakage", NDT.NET, http://www.ndt.net/article/wcndt00/papers/idn050/idn050.htm, Feb. 28, 2001 (date located through http://web.archive.org/web/20010228091355/http://www.ndt.net/article/wcndt00/papers/idn050/idn050.htm).

*Primary Examiner* — Mohammad Ali
*Assistant Examiner* — Md Azad
(74) *Attorney, Agent, or Firm* — Thomas E. Lees, LLC (57) ABSTRACT

The flow of a fluid such as water is controlled through an outlet by detecting sound within an environment at a first time and generating a first profile based upon the content of the sound detected at the first time. The flow of the fluid is further controlled by detecting sound within the environment at a second time and generating a second profile based upon the content of the sound detected at the second time. The flow of the fluid is still further controlled by comparing the second profile with the first profile and controlling a control valve to shut off a supply of the fluid exiting a tap based upon the results of the comparison.

18 Claims, 5 Drawing Sheets

(56) References Cited

U.S. PATENT DOCUMENTS

| | | | |
|---|---|---|---|
| 2004/0128034 A1* | 7/2004 | Lenker et al. | 700/282 |
| 2005/0182499 A1* | 8/2005 | Calise et al. | 700/28 |
| 2006/0174707 A1 | 8/2006 | Zhang | |
| 2008/0309503 A1* | 12/2008 | White et al. | 340/606 |
| 2009/0224927 A1 | 9/2009 | Sudy et al. | |
| 2011/0289675 A1 | 12/2011 | Dunki-Jacobs et al. | |
| 2012/0017998 A1 | 1/2012 | Al-Sahan et al. | |

* cited by examiner

WATER OUTLET CONTROL SYSTEM USING SOUND VARIATION

BACKGROUND

The present invention relates to water control, and in particular to water outlet control that reduces water waste based upon sound variation.

In certain parts of the world, water is abundant. As such, many people use water thoughtlessly or in a manner that leads to water waste. However, fresh, potable water is considered a precious commodity in many parts of the world.

Water that is wasted through water outlets such as taps and showers represents a sizable waste of a valuable and necessary resource. Water can be wasted in a number of manners. For instance, leaving a water tap running for longer than is necessary for an intended use leads to water waste. Additionally, a running water tap can be left open by mistake. As yet another example, a water facet may not be turned off all of the way, so as to drip. Still further, facets, toilets and other water devices can leak.

The problem of water waste is aggregated with each waste. As an example, a running tap may utilize as much as six liters of water per minute. As another example, a regular shower uses up to 45 liters per minute. However, conservation practiced at a small scale by individual consumers can have huge impact in overall efficient use of water resources.

BRIEF SUMMARY

According to aspects of the present invention, the flow of a fluid (such as water) is controlled through an outlet by detecting sound within an environment of the flowing fluid (but outside the outlet and pipe carrying the fluid) at a first time and generating a first profile based upon the content of the sound detected at the first time. The flow of the fluid is further controlled by detecting sound within the same environment at a second time and generating a second profile based upon the content of the sound detected at the second time. The flow of fluid is still further controlled by comparing the second profile with the first profile and controlling a control valve to shut off a supply of fluid exiting a tap based upon the results of the comparison.

DETAILED DESCRIPTION

According to various aspects of the present invention, a water outlet control system provides automatic water outlet control based on acoustic variations in an environment that occur in response to flowing water. In particular implementations, a water outlet is controlled by detecting frequency variation (or the lack thereof) in the sound captured in the environment of flowing water (but outside the outlet and pipe carrying the water), as observed over specific intervals of time. The frequency variation is monitored and the water outlet is shut off once the frequency becomes constant.

For instance, a system detects and avoids water wastage by monitoring the variation of frequency of sound produced by running water that flows on various animate and inanimate objects during normal activities. The monitored variation in frequency of sound is used to differentiate between legitimate use and wastage scenarios. Upon detecting a wastage scenario, such as where the frequencies detected in the captured sound remain consistent for a predetermined interval, one or more necessary actions are taken to avoid the wastage, such as turning off the water flow.

Aspects of the present invention detect water wastage by detecting frequency changes in the sound of flowing water. As such, aspects of the present invention can detect waste in water flow in addition to leaks. That is, water wastage can be detected in situations where the flow of water is significant, i.e., the water outlet is on and is not simply dripping. Further, as will be described in greater detail herein, the detection of water waste can be tuned to factor out ambient noise and other environmental conditions. Accordingly, water outlet control systems described more fully herein, are effective for any heterogeneous use of water outlets.

Although described herein for convenience of discussion as providing automatic water outlet control based on acoustic variations in an environment that occur in response to flowing water, the invention is not limited to water per se. To the contrary, the flow can be any fluid.

Figure 1:
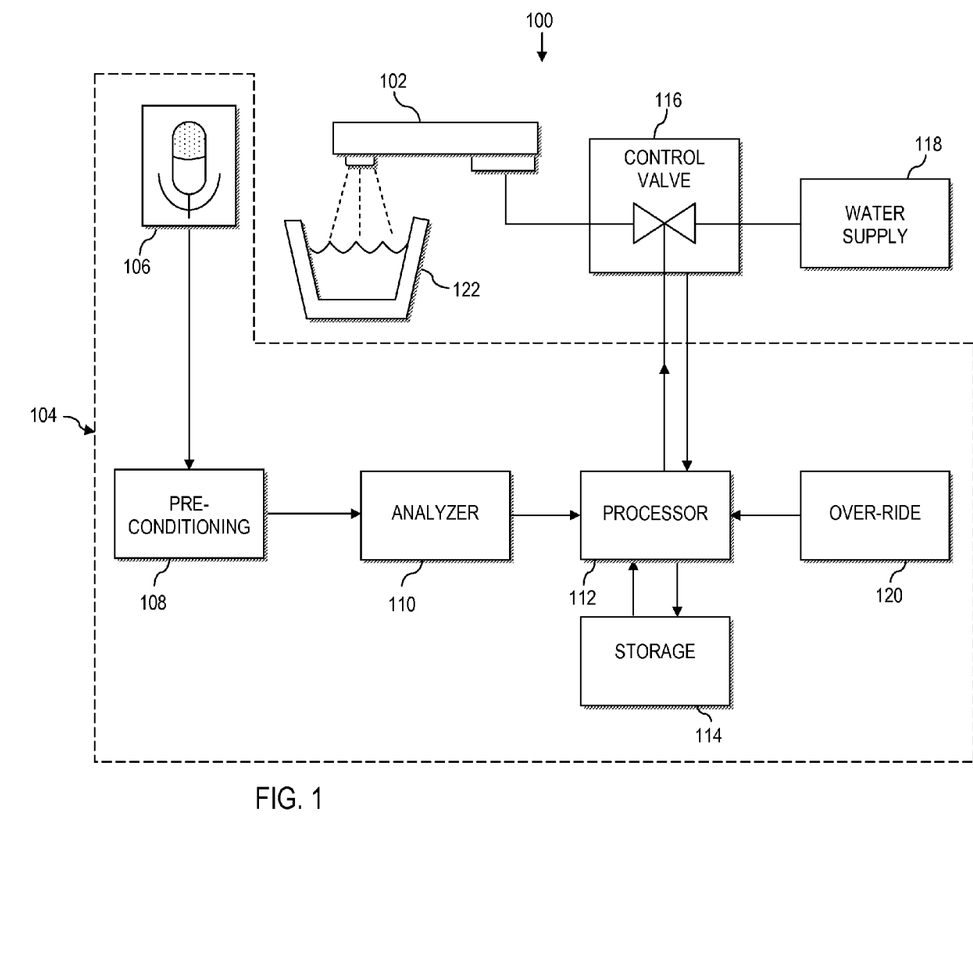
FIG. 1 is a block diagram of a water outlet control system, according to various aspects of the present invention.

Referring now to the drawings and in particular to FIG. 1, a block diagram 100 is provided of a system for monitoring a water outlet 102. In the illustrated block diagram 100, the water outlet 102 is schematically illustrated as a kitchen faucet. However, in practice, the water outlet 102 can be a tap, spigot, faucet, or any other device that can be controlled to permit the flow of water out of a conduit. In general, the water outlet 102 is monitored and controlled as necessary, by a water monitoring system 104. During normal use of the water outlet 102, a user can manually turn on the water outlet 102, use the water for any intended use, then turn the water outlet 102 off without interference from the water monitoring system 104. That is, under normal or legitimate use scenarios, the water monitoring system 104 does not interfere with the use of the water outlet 102. However, if the water outlet 102 is left on unintentionally, or if a water use situation is otherwise deemed a water wastage scenario, the monitoring system 104 will take an action, such as to turn off the water outlet 102.

The illustrated monitoring system 104 comprises in general, an input device 106, an optional pre-conditioning module 108, an analyzer 110, a processor 112 and storage 114.

The input device 106 may be implemented as a microphone, transducer or other device that can detect sound within the environment of the water outlet 102. The input device 106 is mounted near the water outlet 102 and is positioned to pick up sound in the environment of the water outlet 102, thus defining an area of interest. For instance, in an illustrative example, the position of the input device 106 is outside the outlet and pipe (i.e., conduit) of the fluid flow. The area of interest may comprise a sink basin, or other area where the water flows from the outlet to a drain. In practical applications, it may be desirable to filter out background and ambient noise that is not related to the flow of water. The filtering of background noise can be implemented at least in part, through the positioning of the input device 106. For instance, where the input device 106 is a microphone, microphone characteristics can be utilized to improve the sensitivity of the microphone towards the area of interest and to minimize background interference, such as by using a noise-cancelling microphone, or by taking advantage of microphone directional characteristics by selecting a desired microphone input pickup pattern, e.g., using an omni, figure-eight, cardoid, hypercardoid, supercardoid or shotgun pattern as the application dictates.

The signal detected by the input device 106 is optionally coupled to the pre-conditioning module 108. While not required, the pre-conditioning module 108 can be utilized to condition the signal from the input device 106. As an illustrative example, the pre-conditioning module 108 may comprise any combination of pre-conditioning techniques, such as to provide a signal buffer, provide signal gain adjustment, signal filtering or other processing. For example, a filter may be utilized to filter out or otherwise reduce the effect of ambient noise to provide a more accurate frequency profile of the sound of interest to the subsequent components of the monitoring system 104.

The optionally pre-conditioned signal from the input device 104 is then coupled to the analyzer 110. The analyzer 110 comprises a frequency analyzer that is utilized to determine a frequency profile of the sound detected by the input device 106. In an illustrative implementation, the analyzer 110 generates a profile of the sound at configurable periodic intervals. The profile may comprise a frequency profile or other suitable manipulation of the sound information from the input source 106, as will be described in greater detail herein.

Because the monitoring system 104 is dynamic and monitors the water flow in real-time (or near real-time), a new profile is repeatedly generated based upon the predetermined periodic interval. As such, each generated profile is referred to herein as a replicate profile to indicate that each profile is a capture of the same environment (typically from the same location), but at a different snapshot in time. Moreover, since the monitoring system 104 is periodic, the replicate profiles are generated in succession, i.e., as an sequential or ordered series of profiles that are generated one after another.

The output of the analyzer 110, e.g., a frequency profile, is coupled to the processor 112. The processor 112 executes a comparing algorithm that compares a current profile with configurable number of past profiles to determine whether a water waste scenario is detected. The processor 112 recommends actions based on the result of the comparison. For instance, in an illustrative implementation, the processor 112 determines whether a series of replicate profiles captured in succession, have remained constant (within a predetermined degree of similarity) for above a threshold number of observations or whether there is a deviation (beyond the predetermined degree of similarity) between consecutive profiles. That is, the comparison may be exact or the comparison may allow tolerances in the detection of similar frequencies, such as to accommodate for anticipated environmental changes. As an illustrative example, the comparison may comprise profile matching. If successive profiles match (to a predetermined reasonable degree) or if the successive profiles match for a predetermined number of consecutive profile matching operations, the usage may be judged as a waste scenario.

The series of replicate profiles are temporarily stored in the storage 114. In an illustrative example, the storage 114 includes storage space that functions as a queue such that a pre-determined number of replicate profiles can be preserved for analysis and processing. Under this approach, after a new replicate profile is captured and processed, the oldest profile is discarded and the new profile is added to the queue. Other techniques for storing the replicate profiles can alternatively be utilized.

If the processor 112 determines that a water waste situation is occurring, the processor 112 takes an action, such as to shut off, slow down or otherwise affect the flow of water from the water outlet 102. For instance, as illustrated, the processor 112 sends a command to a control valve 116 that causes the control valve 116 to turn off flow of water from a water supply 118 to the water outlet 102. The control valve 116 may also optionally communicate information back to the processor 112. For instance, the control valve 116 may provide information such as whether or not the valve is open and supplying water to the water outlet 102. This may be used for training purposes, e.g., to identify ambient or background conditions when no water is flowing compared to when water is normally flowing, etc.

The monitoring system 104 can also optionally include an over-ride 120, which may be utilized to temporarily disable the ability of the monitoring system 104 to turn off the water supply at the control valve 116. The over-ride 120 can switch off the monitoring system 104, or over-ride the actions of the processor 112. As yet another example, the optional over-ride can be connected to a feedback circuit to vary frequency matching logic implemented by the comparing algorithm of the processor 112, e.g., to tune to processor algorithm to be more accurate.

The determination of legitimate use compared to waste is based upon the content of the information collected by the input device 106, which represents the sound in the environment of the running water, e.g., external to the conduit that carries the water to the water outlet, and external to the monitoring system 104, itself. That is, the monitoring system 104 does not rely on transmitting a generated signal and listening back for the transmitted signal. Rather, the monitoring system 104 listens to the vibrations in the environment of the running water. The actual frequency at which an object vibrates is determined by a variety of factors. Each of these factors will either affect the wavelength or the speed of the vibration, since frequency=speed/wavelength.

As a non-limiting example, a bucket 122 that is filling with water from the water outlet 102 can be considered for purposes of analysis, as a closed organ pipe whose one end is closed by water that has filled into the bucket 122. As the water fills the bucket 122, the length of this closed organ pipe, and thus the fundamental wavelength of sound changes. For instance, as the wavelength decreases, the frequency will increase.

Once the bucket is full, the water starts to overflow out of the bucket 122. In this scenario, once the bucket 122 is full, the distance between the water outlet 102 and the level of water in the bucket 122 does not change. As such, the length of the closed organ pipe does not change and hence the wavelength and frequency remain constant. Thus, by detecting the rising frequency of the bucket 122 as the bucket fills, the monitoring system 104 can deduce the water use to be legitimate. However, after detecting a stop to the pattern of rising frequency (detecting constant frequency over a period of time) the monitoring system 104 can deduce a water waste scenario.

Similarly, when one washes utensils, hands or any other object under running water from the water outlet 102, the object (hand, utensil etc.) causes an obstruction in the flow of water. The obstruction causes the speed of the water flow to change. That is, the speed of water flow out of the water outlet 102 will be different before the flowing water hits the object compared to the speed of water flow after hitting the object.

As a result, the frequency profile of the water flow as the object moves about under the water changes. However, once the object (and hence, the obstruction) is removed, the frequency becomes constant. By detecting the change in frequency at different intervals in time and at different points in the flow, the monitoring system 104 can determine whether the water coming out of the water outlet 102 is being used or whether the flowing water is judged to be wasted. In an illustrative example, if the frequency of the water flow remains constant for a configurable amount of time, the monitoring system 104 determines that the flowing water is not being used in a useful manner and the monitoring system issues a command to shut off the flow of water to the water outlet 102.

Figure 2:
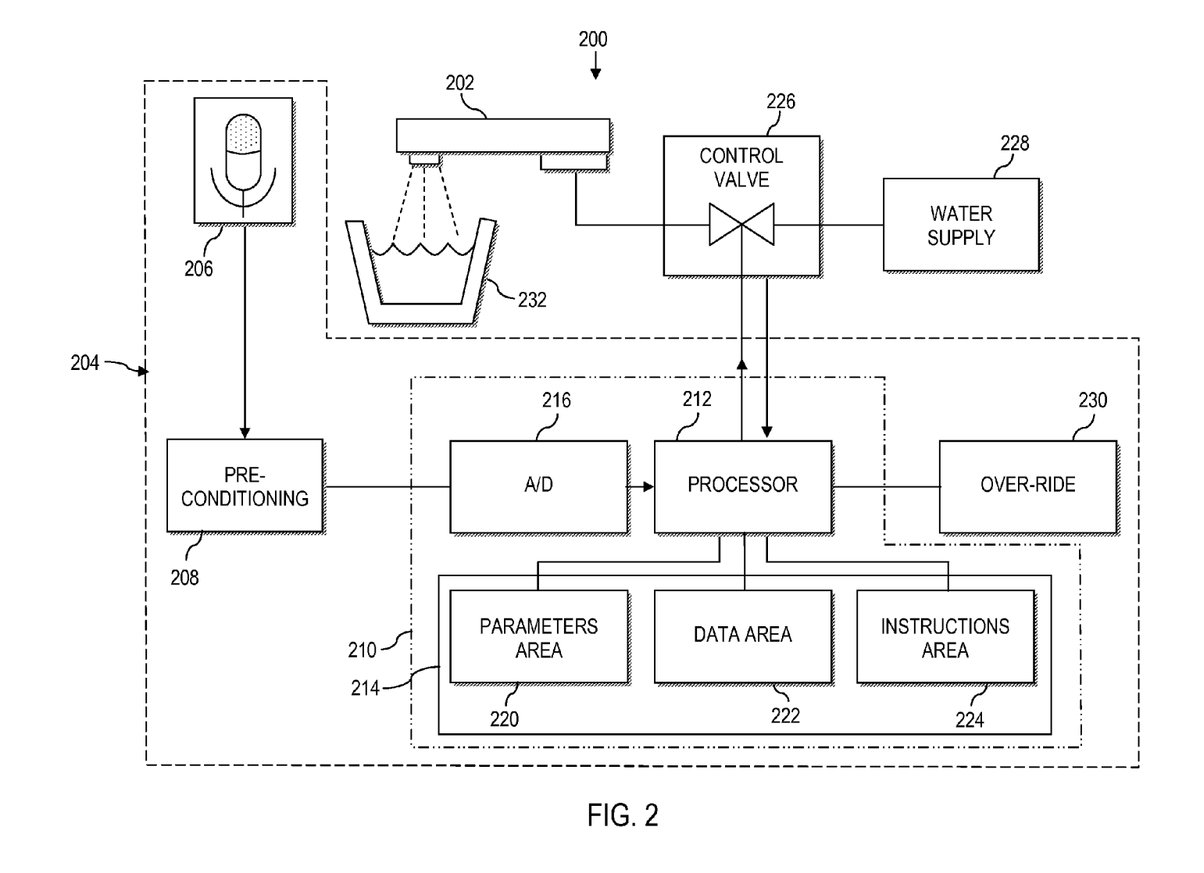
FIG. 2 is a block diagram of a water outlet control system, according to further aspects of the present invention.

Referring now to FIG. 2, a block diagram 200 is provided of an alternative system for monitoring a water outlet 202. The system of FIG. 2 is analogous in function to the system of FIG. 1, except that certain functions are performed in software within a controller, as compared to optionally providing dedicated components.

In general, a water outlet 202 is monitored by a monitoring system 204. In the illustrated block diagram 200, the water outlet 202 is analogous to the water outlet 102 of FIG. 1. Likewise, the monitoring system 204 is analogous in function to the monitoring system 104 of FIG. 1. The illustrated monitoring system 204 comprises in general, an input device 206, an optional pre-conditioning module 208 and a controller 210.

The input device 206 is analogous to the input device 106 described with reference to FIG. 1. Thus, in an analogous manner to that of FIG. 1, the input device 206 is mounted near the water outlet 202 and is positioned to pick up sound in a area of interest, e.g., in a sink basin, or other area where the water flows.

The signal detected by the input device 206 is optionally coupled to the pre-conditioning module 208, which conditions the signal from the input device 206. The pre-conditioning module 208 can implement functions analogous to the pre-conditioning module 108 described with reference to FIG. 1. For instance, the pre-conditioning module 208 may comprise circuitry that buffers the signal from the input device 206. The pre-conditioning module 208 may also provide circuitry that provides gain adjustment to the signal from the input device 206. Still further, the pre-conditioning module 208 may provide filtering of the signal from the input device 206. The output of the pre-conditioning circuitry is coupled to the controller 210.

The controller 210 includes in general, a processor 212 and storage 214. The processor 212 and storage 214 implement functions that are analogous to the processor 112 and storage 114 described with reference to FIG. 1. In an illustrative implementation, the controller 210 is implemented as a microcontroller that includes an analog to digital converter 216. As an illustrative example, the pre-conditioning module 208 may include analog circuitry that implements one or more of a buffer, gain adjustment, filtering and other necessary signal processing to couple the analog signal from the input device 206 to the analog to digital converter 216. The output of the analog to digital converter 216 is then coupled to the processor 212. In alternative implementations, analog to digital conversion is provided by the pre-conditioning module 208 or by an external converter (not shown) that is between the pre-conditioning module 208 and the processor 212.

The processor 212 receives the digital signal from the analog to digital converter 216 for data processing. For instance, the processor 212 can provide filtering (or additional filtering), such as to filter out or otherwise reduce the effect of ambient noise to provide a more accurate frequency profile of the sound of interest to the subsequent components of the monitoring system 204. For instance, filtering (which is performed by the pre-conditioner 108 of FIG. 1) can be implemented in software by executing a filtering algorithm by the processor 212. Additionally, the processor 212 performs a function analogous to the analyzer 110 described with reference to FIG. 1. That is, the processor 212 analyzes the (optionally filtered) digital signal, e.g., by performing frequency analysis, to generate a frequency profile of the sound detected by the input device 204. In an illustrative implementation, the processor 212 generates a profile of the sound at configurable periodic intervals in a manner analogous to that described with reference to FIG. 1.

In a manner similar to the monitoring system of FIG. 1, the processor 212 executes an algorithm that compares a current profile with configurable number of past profiles to determine whether a water waste scenario is detected. The processor 212 recommends actions based on the result of the comparison. For instance, in an illustrative implementation, the processor 212 determines whether a series of replicate profiles captured in succession, have remained constant (within a predetermined degree of similarity) for above a threshold number of observations or whether there is a deviation (beyond the predetermined degree of similarity) between consecutive profiles. The comparison may be exact or the comparison may allow tolerances to accommodate for the detection of similar frequencies, such as to accommodate environmental changes.

The storage 214 is logically illustrated as three functional areas, including a parameters area 220, a data area 222 and an instructions area 224. The parameters area stores system and/or user-configurable parameters that affect the manner in which the processor 212 performs data analysis. The parameters area 220 may store data that dictates the number of past replicates to be temporarily stored for data analysis, threshold setting(s) for performing profile comparison or profile matching, data filtering parameters, such as to control whether the frequency range is limited, to control the resolution of various frequency bands, to determine whether the generated profiles are based upon smoothed data, the level/resolution of smoothing, etc. The data area 222 acts as a storage area or otherwise functions as a queue to store the profiles that are used for data analysis, in a manner analogous to that described with reference to FIG. 1. The instructions area 224 stores the computer program instructions that cause the processor 212 to execute the methods and processes as set out and described in greater detail herein.

If the processor 212 determines that a water waste situation is occurring, the processor 212 takes an action, such as to shut off, slow down or otherwise affect the flow of water from the water outlet 202. For instance, as illustrated, the processor 212 sends a command to a control valve 226 that causes the control valve 226 to turn off flow of water from a water supply 228 to the water outlet 202. The control valve 226 may also optionally communicate information back to the processor 212. In this regard, the control valve 226 is analogous to the control valve 116 of FIG. 1.

The monitoring system 204 can also optionally include an over-ride 230, which functions analogously to the over-ride 120 described with reference to FIG. 1.

As a non-limiting example of the monitoring system 204, assume that a bucket 232 is filling with water from the water outlet 202. The input device 206 detects the sound of the water filling the bucket 232. The signal from the input device 206, e.g., a noise-cancelling microphone, is optionally conditioned, and then is sampled by the analog to digital converter 216. The digital signal is processed by the processor 212. Particularly, the digital signal is optionally filtered, and then the digital signal is processed to generate a frequency profile. The generated frequency profile is compared to one or more past profiles, which are temporarily stored in the data area 222.

If the processor 212 detects that the frequency of the current profile is different enough from the past profile(s), then the processor 212 continues to monitor the running water. The new profile is saved in the data area 222 as a past profile. The oldest profile is discarded, and the monitoring system 204 continues to monitor the flow of water filling the bucket 232. Once the bucket 232 is full, the water starts to overflow out of the bucket 232. From this time on, the frequency of the running water does not significantly change.

At some interval, a new profile is generated by the processor 212. When the processor 212 performs the comparison, if the result indicates that the current profile compared to one or more past profiles has not significantly changed, then the water usage is judged as being wasted, and the processor 212 sends a command to the control valve 226 to shut off the water to the water outlet 202. In practice, the system may be programmed, e.g., via a variable in the parameter area 220, to require more than one comparison indicating no significant profile change. The parameters in the parameter area 220 can also be used to determine what constitutes similar profiles, e.g., by establishing a threshold or tolerance of differences between compared profiles. Still further, parameters can be used to differentiate detected uses, e.g., to differentiate use in a kitchen restaurant compared to a kitchen in a house, to set parameters that factor different types of ambient noise, to set different threshold parameters, etc.

Figure 3:
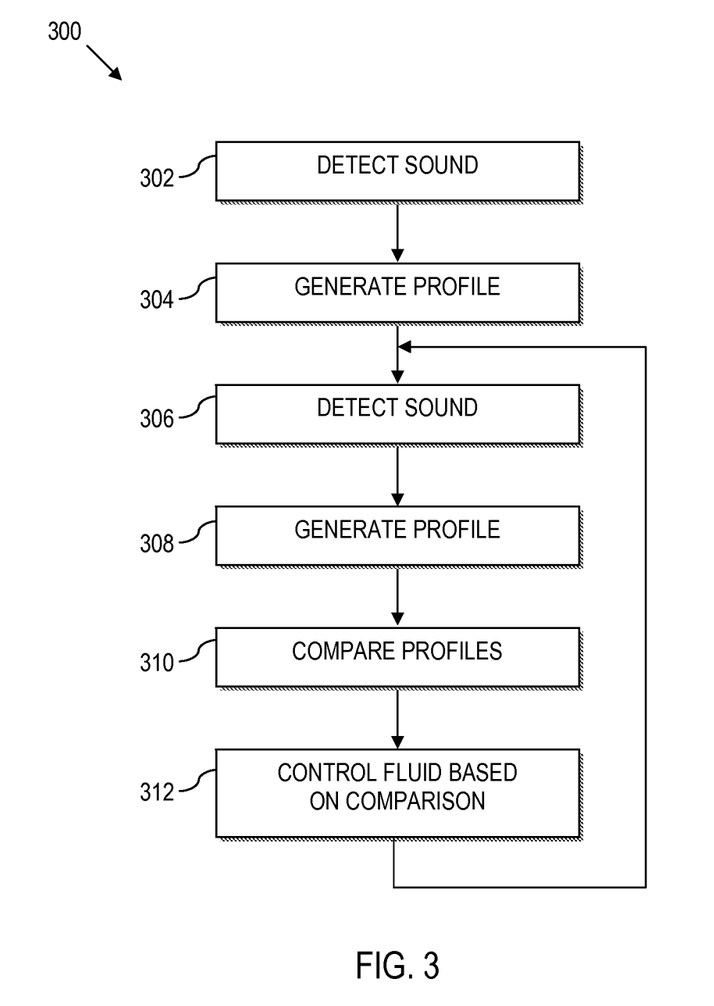
FIG. 3 is a flow chart of a method for controlling the flow of water through a water outlet, according to aspects of the present invention.

Referring to FIG. 3, a method 300 is provided for controlling the flow of a fluid through an outlet, according to certain aspects of the present invention. The method 300 may be implemented, for instance, as computer code executed by a processor of an electronic device, e.g., in a manner analogous to that set out in greater detail herein. For instance, the method 300 may be implemented by the processor 112 of FIG. 1. As another example, the method 300 may be implemented as code stored in a computer-readable storage medium, e.g., as stored in instructions area 224 that are executed by the processor 212 of FIG. 2. Alternatively, the method 300 can be executed as a process by other processing systems.

The method 300 for controlling the flow of a fluid (e.g., such as water) through an outlet comprises detecting sound within an environment at a first time at 302 and generating a first profile based upon the content of the sound detected at the first time at 304. The sound can be detected, for instance, using an input device 102, 202 described with reference to FIG. 1 and FIG. 2, respectively. Further, the sound can be detected outside the outlet and pipe(s) that carry the fluid. The first profile can be generated, for instance, using the monitoring system 104 of FIG. 1 or the monitoring system 204 of FIG. 2. The method 300 further comprises detecting sound within the environment at a second time at 306 and generating a second profile based upon the content of the sound detected at the second time at 308.

The method 300 still further comprises comparing the second profile with the first profile at 310 and controlling a control valve to shut off a supply of the fluid exiting a tap based upon the results of the comparison at 312. For instance, the comparison may comprise identifying the difference between the first profile and the second profile and shutting off the supply of the fluid by controlling the control valve if the difference does not exceed a predetermined threshold.

In practice, the processor 112 of FIG. 1 or the processor 212 of FIG. 2 can be utilized to perform a comparison of the second profile to the first profile and control the corresponding control valve in response to the comparison. Control may comprise turning the fluid off if the comparison judges the fluid use to be a wasted use, or allowing the fluid to continue run if the comparison judges the fluid use to be a legitimate use.

As noted in greater detail herein, the profiles may be implemented as frequency profiles. In this illustrative implementation, generating a first profile comprises generating the first profile to have frequency information of the sound of the fluid in its environment, which is detected at the first time and generating a second profile comprises generating the second profile to have frequency information of the sound of the fluid in its environment, which is detected at the second time. Although frequency is used as a primary indicator within a given profile, each generated profile is not limited to frequency information. For instance, other parameters, such as level can also be used as an indicator when the comparison of the profiles is performed.

The method then loops back to 306 to detect sound and generate the next profile. In this implementation, the method 300 may designate the first profile as a past profile, then repeatedly perform a flow control operation by detecting sound within the environment at a current time, generating a current profile based upon the content of the sound detected at the current time, comparing the current profile with the past profile, controlling the control valve to shut off a supply of fluid exiting the tap based upon the results of the comparison and designating the current profile as the new past profile. This operation can loop as many times as necessary. Moreover, the time between capturing each profile can be set to any desired time frame.

The method of FIG. 3 can optionally be extended to compare the second profile with one or more past profiles. For instance, the method 300 may further comprise designating the second profile as a current profile. The method 300 may also further comprise generating a plurality of past profiles by designating the first profile as a past profile, detecting sound within the environment during at least one additional time before the second time (now designated the current time) and generating an additional past profile based upon the content of the sound detected at each additional time. Under this implementation, comparing the second profile with the first profile at 310 further comprises comparing the current profile to the plurality of past profiles.

Figure 4:
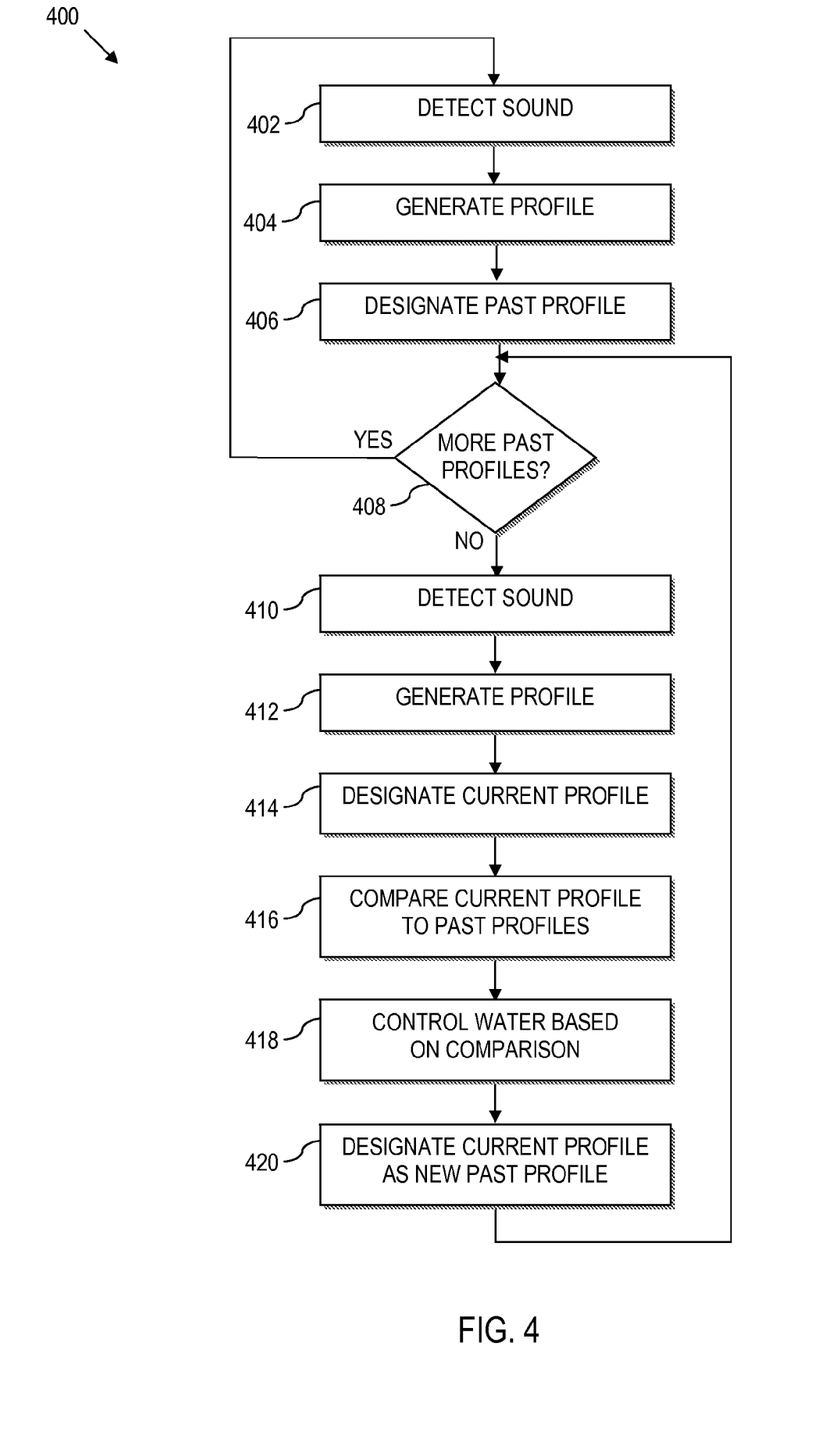
FIG. 4 is a flow chart of a method for controlling the flow of water through a water outlet, according to further aspects of the present invention.

Referring to FIG. 4, a method 400 is provided for controlling the flow of water through a water outlet, according to further aspects of the present invention. Although described with reference to water for clarity of discussion, the method 400 is broadly applicable to other fluids. The method 400 may be implemented, for instance, as computer code executed by a processor of an electronic device, e.g., in a manner analogous to that set out in greater detail herein. For instance, the method 400 may be implemented by the processor 112 of FIG. 1. As another example, the method 400 may be implemented as code stored in a computer-readable storage medium, e.g., as stored in instructions area 224 that are executed by the processor 212 of FIG. 2. Alternatively, the method 400 can be executed as a process by other processing systems.

The method 400 for controlling the flow of water through a water outlet comprises detecting sound within an environment at 402, generating a profile based upon the content of the sound detected at the first time at 404 and designating the profile as a past profile at 406. The sound can be detected, for instance, using an input device 106, 206 described with reference to FIG. 1 and FIG. 2, respectively. The profile can be generated, for instance, using the monitoring system 104 of FIG. 1 or the monitoring system 204 of FIG. 2. The method 400 is dynamic, and performs relative comparisons of a current profile to at least one past profile. As such, a first profile is generated that will serve as a basis for subsequent comparison. A determination is made at 408 as to whether any further past (historical) profiles are required. This may be necessary for instance, when the method first begins a monitoring operation where a current profile is compared to a plurality of past profiles. If YES at the decision of 408 (i.e., additional past profiles are required) then the method 400 loops back to 402 to detect sound and generate another profile. In this regard, one or more past profiles are generated and are temporarily stored as replicate past profiles. The replicate past profiles may be stored in a queue or other storage device that preserves the chronology of when the past profiles were collected.

Once all necessary past profiles have been generated (if NO at the decision at 408), then the method 400 further comprises detecting sound within the environment at a 410 and generating a profile at 412 based upon the content of the sound detected at 410. The profile generated at 412 is designated a current profile.

The method 400 still further comprises comparing the current profile with the past profile(s) at 416 and controlling a water control valve to shut off a supply of water exiting a water tap based upon the results of the comparison at 418. For example, the processor 112 of FIG. 1 or the processor 212 of FIG. 2 can be utilized to perform a comparison of the second profile to the first profile and control the corresponding water control valve in response to the comparison. Control may comprise turning the water off if the comparison judges the water use to be a wasted water use, or allowing the water to continue run if the comparison judges the water use to be a legitimate water use.

At 420, the current profile has now been processed, so the method designates the current profile as a "new" past profile. That is, the profile generated at 412 is moved to the group of past replicate profiles. Optionally, the oldest profile in the group of past replicate profiles is discarded. Flow then resumes. The flow may optionally loop back up to the decision at 408 to determine whether additional past profiles are necessary. As another example, flow can loop back to 410 to collect information on the sound within the environment.

The comparison of the current profile to the past profile(s) at 416 may comprise for example, comparing the current profile to each past profile individually, where each comparison is designated as an observation. A given observation is considered to be constant if the difference between the current profile and the corresponding past profile is less than a first threshold. The method determines whether the current profile has remained constant for above a second threshold number of observations. Thus, the first threshold is used to determine how much two profiles can deviate from one another and still be judged as similar. This allows a fuzzy comparison to be performed where precisely identical profiles are not necessary. The second threshold sets the number of consecutive profiles that must be judged to be similar to the current profile before the method will take action, e.g., to shut off the water. The first and second thresholds may be user adjustable parameters or system defined parameters, e.g., as stored in the parameters area 220 of FIG. 2. Also, the threshold values can vary, e.g., depending upon the environment. For instance, a use is a commercial restaurant kitchen may require different parameter values than the corresponding use in a typical home kitchen. Thus, the method can be "tuned" to a particular application.

According to exemplary implementations, in the methods of FIG. 3 and FIG. 4, comparing profiles comprises identifying the difference between the profiles being compared. In this regard, identifying differences may comprise for example, adapting for predetermined conditions by changing the matching criteria used to identify differences. This can allow for further tuning to account for environmental conditions, anticipated legitimate uses, etc.

Adapting for predetermined conditions may include for instance, varying at least one time-based parameter when detecting sound, such as by generating a new frequency profile of the sound detected by the input device at configurable periodic intervals. Thus for example, the methods may further comprise setting a time interval between generating consecutive profiles, dynamically changing the time interval between consecutive profiles, setting the length of time to record a sample, etc.

Changing the matching criteria may comprise for example, changing at least one parameter affecting the frequency determination that affects identifying differences. As a few illustrative examples, the methods may filter the captured sound to a predetermined frequency range or otherwise limit the scope of comparison to a particular frequency range. Additionally, the frequency spectrum can be divided into a plurality of bands. Each band can be sized to fit the needs of a particular application. For instance, bands that include critical frequencies may be narrower than bands that contain useful, but comparatively less relevant information. Each band may have a different tolerance to determine whether compared profiles are judged to be similar. Alternatively, a single tolerance parameter may be used across all frequencies.

Any combination of profile pre-processing, profile generation and profile processing may be implemented, including for instance, filtering, smoothing the frequency data, implementing the parameters of a Fast Fourier Transform (FFT) algorithm to adjust binning, depth or resolution, etc. Still further, data processing techniques may comprise oversampling, sample averaging, profile averaging, statistical processing and other techniques to prepare the profiles for comparison. As an example, an illustrative embodiment uses a frequency distribution table that includes various frequency ranges contained in the detected sound waves to build each frequency profile.

With general reference to the FIGURES herein, various aspects of the present invention use relative variation in frequency when water hits objects outside of a water outlet to differentiate between legitimate usage and wastage. As such, the profile comparison does not rely solely on an overall amplitude level to distinguish legitimate and waste use scenarios. However, amplitude can be a factor that is considered in the comparison. This may include overall signal level, average signal level, average signal across a frequency range, or the amplitude of specific frequency bands. This allows the discrimination between legitimate use and waste regardless of flow rate.

Moreover, the discrimination herein does not rely on previously determined, static "signatures" or classifiers. Rather, the discrimination is dynamic and is based upon a recent history of the usage itself by generating profiles as replicates measured over time, of the actual environment in which the water is used. That is, according to illustrative implementations, all profiles used for the comparison are observed.

Still further, the input device measures sound from an environment external to the water conduit leading to the discharge of water from the water outlet, and external to the system itself. This may comprise an environment that includes a sink, basin, floor and drain, etc. Moreover, the profiles are generated from externally occurring noise (including running water) within an environment. That is, the profile is not generated based upon detecting a sound that was injected or otherwise transmitted into the environment by the system itself. Rather, the sound detected in the various aspects of the present invention comprises the sound of water exiting a water outlet and hitting an object outside the piping system during its normal flow.

Various aspects of the present invention provide the ability to target taps left open by mistake, broken pipes and leaks of any size, and to differentiate between legitimate uses and waste in these scenarios. In cases where user leaves the tap open, e.g., to allow water to simply flow down a drain, or the flow is equivalent to normal usage, aspects of the present invention can identify such uses as wastage by detecting lack of change in replicate frequency profiles. Moreover, because dynamically changing replicate profiles serve as the basis for comparison herein, wastage can be detected, even in scenarios that cannot be discerned by static, predetermined and pre-stored signatures, or by static timers. For instance, if static signatures were used, a running faucet would be classified as a legitimate use. However, aspects of the present invention can use profiles over time to discriminate between uses that are legitimate and uses that are no longer legitimate, as described in greater detail herein. That is, various aspects of the present invention rely upon the use of dynamic frequency profiles collected as observations within an operating environment, where profiles are compared to discern relative changes in frequency between observations. As such, the continuous dynamic and relative comparison of frequency profiles is provided.

According to still further aspects of the present invention, the profile matching (or profile comparison) is adaptable for varying degrees of flow and sound by changing the matching criteria and size of frequency profile compared. Still further, conditions, time of day and other environmental factors can be captured as parameters that affect the profile comparison.

As another example, matching logic described in greater detail herein, can be configured to accept ranges of frequency profiles for legitimate matches and tune the measuring unit to allow for various flow levels and/or to interpret variations within observed flow. As still another example, the configurations disclosed herein can be tuned to allow for frequency range matching to be performed or for time period of observation to be varied as needed.

The systems and methods described herein are useful in developing parts of the world where shared community taps and multi-purpose water outlets are used extensively, and in environments where running water is not provided all the time. In such cases, there is a greater chance of people forgetting to turn off the tap after fulfilling their need.

Still further aspects of the present invention can provide a learning system. In leaning mode, a user or the system turns on and off the water and allows the system to learn distinct range of frequencies to filter to eliminate ambient noise. Learning can also be used to set filter levels for noise selection and removal. In an exemplary implementation, during the learning phase, the system creates template profiles that represent various environmental conditions, such as breakfast time vs dinner time vs quiet time vs TV time, etc. The system can then use the profiles as the basis for profile comparisons instead of taking the first measured profile.

According to still further aspects of the present invention, template profiles can be factory created, e.g., based on the recreation of common environmental noises in target environment, such as a house, restaurant etc. In this illustrative implementation, the learning system is adjusted so that the learning system only needs to adjust the profile to real world conditions. This may allow for the system to learn quickly and also allow for the frequency detection mechanism included in the system to be less accurate (and theoretically cheaper) than a high-fidelity systems afforded in factories.

Figure 5:
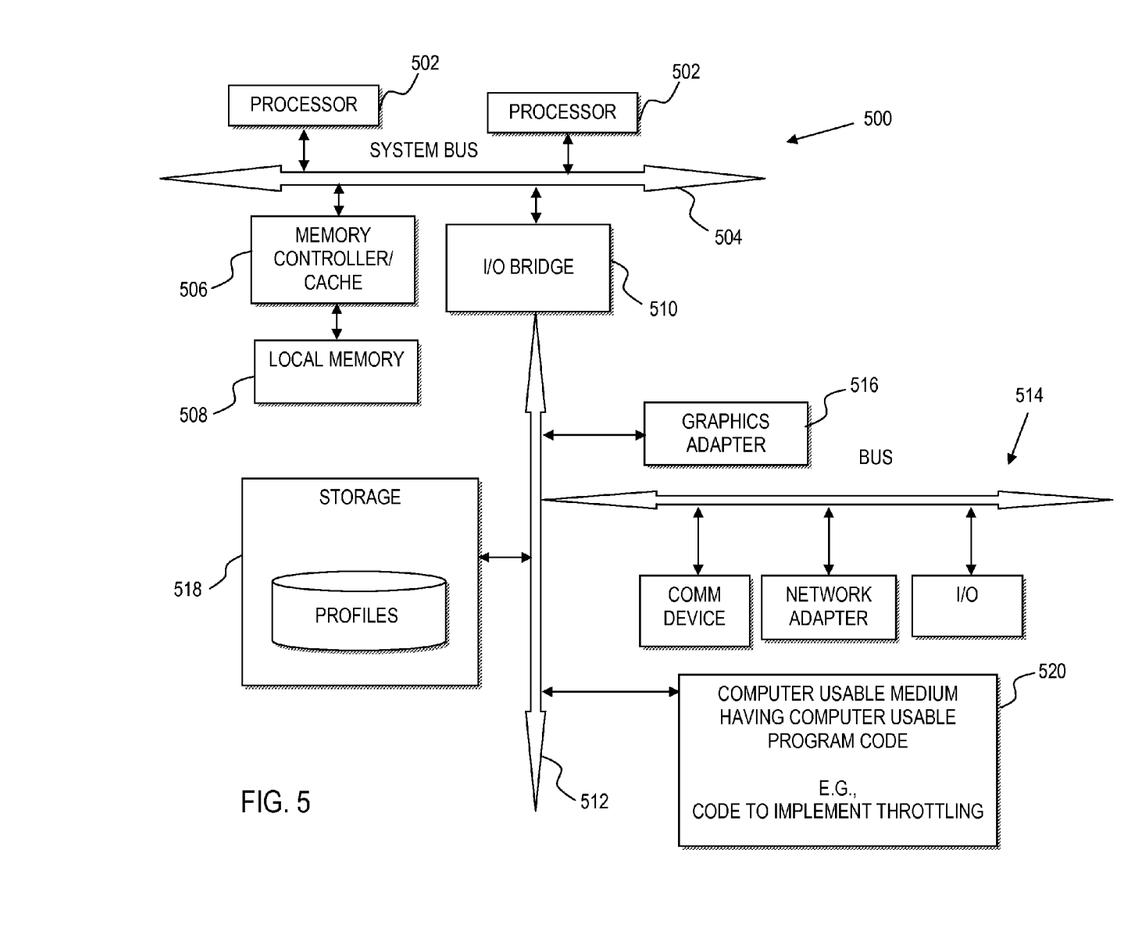
FIG. 5 is a block diagram of a computer system having a computer readable medium for storing program code that executes the method of FIG. 3 and/or FIG. 4, according to various aspects of the present invention.

Referring to FIG. 5, a block diagram of a data processing system is depicted in accordance with the present invention. Data processing system 500 may comprise a symmetric multiprocessor (SMP) system or other configuration including a plurality of processors 502 connected to system bus 504. Alternatively, a single processor 502 may be employed. Also connected to system bus 504 is memory controller/cache 506, which provides an interface to local memory 508. An I/O bus bridge 510 is connected to the system bus 504 and provides an interface to an I/O bus 512. The I/O bus may be utilized to support one or more buses and corresponding devices 514, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 516, storage 518, and a computer usable storage medium 520 having computer usable program code embodied thereon. The computer usable program code may be executed to implement any aspect of the present invention, for example, to implement any aspect of any of the methods and/or system components illustrated in FIGS. 1-4.

The data processing system depicted in FIG. 5 may comprise, for example, an IBM RS/6000 system, a product of International Business Machines Corporation in Armonk, N.Y., running the Advanced Interactive Executive (AIX) operating system. An object oriented programming system such as Java may run in conjunction with the operating system and provides calls to the operating system from Java programs or applications executing on data processing system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), a Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Having thus described the invention of the present application in detail and by reference to embodiments thereof, it will be apparent that modifications and variations are possible without departing from the scope of the invention defined in the appended claims.

What is claimed is:

1. A method for controlling a flow of a fluid through an outlet comprising:
    detecting a first sound within an environment of a flowing fluid at a first time, wherein the environment is outside a pipe carrying the flowing fluid;
    generating a first profile based upon content of the first detected sound at the first time, wherein the first profile is a first frequency profile;
    detecting a second sound within the same environment at a second time in succession with the first time;
    generating a second profile based upon content of the second detected sound at the second time, wherein the second profile is a second frequency profile;
    comparing the second profile with the first profile to determine if there is a change in the frequency of the first profile and the second profile over time; and
    controlling a control valve to shut off a supply of the fluid exiting a tap if the comparison indicates that the change in frequency between the first profile and the second profile over time is below a predetermined threshold.

2. The method according to claim 1 wherein:
    generating a first profile comprises generating the first profile to have frequency information of the first sound of the fluid in its environment from a source outside the tap and pipe carrying the fluid, which is detected at the first time;

generating a second profile comprises generating the second profile to have frequency information of the second sound of the fluid in its environment at the same location and from the same source outside the tap and pipe carrying the fluid, where the second profile is detected at the second time.

3. The method according to claim 1, further comprising:
designating the second profile as a current profile;
generating a plurality of past profiles by:
   designating the first profile as a past profile;
   detecting an additional sound within the environment during at least one additional time before the second time; and
   generating an additional past profile based upon content of the detected additional sound at each additional time;
wherein:
comparing the second profile with the first profile further comprises comparing the current profile to the plurality of past profiles.

4. The method according to claim 3 wherein:
comparing the current profile to the plurality of past profiles comprises:
   comparing the current profile to each past profile individually, where each comparison is designated as an observation;
   considering a given observation to be constant if the difference between the current profile and a past profile of the plurality of past profiles that corresponds to the given observation is less than a first threshold; and
   determining whether the current profile has remained constant for above a second threshold number of observations.

5. The method according to claim 1, further comprising:
designating the first profile as a past profile; and
repeatedly performing a flow control operation by:
   detecting a current sound within the environment at a current time;
   generating a current profile based upon content of the current detected sound at the current time;
   comparing the current profile with the past profile;
   controlling the control valve to shut off a supply of the fluid exiting the tap based upon results of the comparison; and
   designating the current profile as the past profile after comparing the current profile with the past profile.

6. The method according to claim 1 wherein:
identifying the difference between the first profile and the second profile comprises adapting for predetermined conditions by changing matching criteria used to identify differences.

7. The method according to claim 6 wherein:
changing the matching criteria comprises changing at least one parameter affecting a frequency determination used to identify differences.

8. The method according to claim 1, further comprising:
adapting for predetermined conditions by varying at least one time-based parameter when detecting sound.

9. A system that controls flow of a fluid through an outlet comprising:
a processor coupled to memory, the memory including instructions that cause the processor to:
   receive a first detected sound within an environment of a flowing fluid at a first time, wherein the environment is outside a pipe carrying the flowing fluid;
   generate a first profile based upon content of the first detected sound at the first time, wherein the first profile is a first frequency profile;
   receive a second detected sound within the environment at a second time, wherein the second sound is detected in succession with the first time;
   generate a second profile based upon the content of the second detected sound at the second time, wherein the first profile is a first frequency profile;
   compare the second profile with the first profile to determine if there is a change in the frequency of the first profile and the second profile over time; and
   control a control valve to shut off a supply of the fluid exiting a tap if the comparison indicates that the change in frequency between the first profile and the second profile over time is below a predetermined threshold.

10. The system according to claim 9 wherein:
the processor is programmed to generate the first profile by generating the first profile to have frequency information of the first sound of the fluid in its environment from a source outside the tap and pipe carrying the fluid, which is detected at the first time;
the processor is programmed to generate the second profile by generating the second profile to have frequency information of the second sound of the fluid in its environment at the same location and from the same source outside the tap and pipe carrying the fluid, where the second profile is detected at the second time.

11. The system according to claim 9 wherein the processor is further programmed to:
designate the second profile as a current profile;
generate a plurality of past profiles by:
   designating the first profile as a past profile;
   detecting an additional sound within the environment during at least one additional time before the second time; and
   generating an additional past profile based upon content of the detected additional sound at each additional time;
wherein:
the processor compares the second profile with the first profile further comprises comparing the current profile to the plurality of past profiles.

12. The system according to claim 11 wherein:
the processor is programmed to compare the current profile to the plurality of past profiles by:
   comparing the current profile to each past profile individually, where each comparison is designated as an observation;
   considering a given observation to be constant if the difference between the current profile and a past profile of the plurality of past profiles that corresponds to the given observation is less than a first threshold; and
   determining whether the current profile has remained constant for above a second threshold number of observations.

13. The system according to claim 9 wherein the processor is further programmed to:
designate the first profile as a past profile; and
repeatedly perform a flow control operation by:
   detecting a current sound within the environment at a current time;
   generating a current profile based upon content of the detected current sound at the current time;
   comparing the current profile with the past profile;

controlling the control valve to shut off a supply of the fluid exiting the tap based upon results of the comparison; and designating the current profile as the past profile after comparing the current profile with the past profile.

14. The method according to claim 1 wherein:
the processor is programmed to identify the difference between the first profile and the second profile by adapting for predetermined conditions by changing matching criteria used to identify differences.

15. The system according to claim 14 wherein:
the processor is programmed to change the matching criteria by changing at least one parameter affecting a frequency determination used to identify differences.

16. The method according to claim 1 wherein:
the processor is further programmed to adapt for predetermined conditions by varying at least one time-based parameter when detecting sound.

17. Computer readable storage hardware that contains program code that controls the flow of a fluid through an outlet comprising computer instructions that instruct a processor to:
receive a first detected sound within an environment of a flowing fluid at a first time, wherein the environment is outside a pipe carrying the flowing fluid;

generate a first profile based upon content of the first detected sound at the first time, wherein the first profile is a first frequency profile;

receive a second detected sound within the environment at a second time in succession with the first time;

generate a second profile based upon the content of the second detected sound at the second time, wherein the second profile is a second frequency profile;

compare the second profile with the first profile to determine if there is a change in the frequency of the first profile and the second profile over time; and control a control valve to shut off a supply of the fluid exiting a tap if the comparison indicates that the change in frequency between the first profile and the second profile over time is below a predetermined threshold.

18. The computer readable storage hardware according to claim 17 wherein:
the processor is programmed to generate the first profile by generating the first profile to have frequency information of the first sound of the fluid in its environment, from a source outside the tap and pipe carrying the fluid, and the processor is programmed to generate the second profile by generating the second profile to have frequency information of the second sound of the fluid in its environment at the same location and from the same source outside the tap and pipe carrying the fluid, where the second profile is detected at the second time.

* * * * *